United States Patent [19]

Mudge et al.

[11] Patent Number: 4,911,960

[45] Date of Patent: Mar. 27, 1990

[54] LAMINATING ADHESIVE FOR FILM/PAPER MICROWAVABLE PRODUCTS

[75] Inventors: Paul R. Mudge, Belle Mead; James L. Walker, Whitehouse Station, both of N.J.; Terence M. Barnhart, Mishawaka, Ind.

[73] Assignee: National Starch and Chemical Corporation, Bridgewater, N.J.

[21] Appl. No.: 145,421

[22] Filed: Jan. 19, 1988

[51] Int. Cl.$^4$ .................. B65D 33/22; B65D 85/00; C08L 33/00; B32B 27/08

[52] U.S. Cl. .................. 428/34.3; 428/475.2; 428/481; 428/514; 428/516; 428/518; 383/123; 426/111; 426/113; 426/234; 524/502; 524/808

[58] Field of Search .................. 428/34.3, 475.2, 481, 428/514, 516, 518

[56] References Cited

U.S. PATENT DOCUMENTS

| | | |
|---|---|---|
| 2,480,551 | 0/0000 | Coffman et al. .................. 526/324 |
| 2,965,617 | 12/1960 | MacDonald .................. 526/318 |
| 3,201,374 | 8/1965 | Simms .................. 260/80 |
| 3,268,357 | 8/1966 | Hart et al. .................. 117/122 |
| 3,345,318 | 10/1967 | Lindemann .................. 260/29 |
| 3,467,565 | 9/1969 | Utz .................. 156/244 |
| 3,483,171 | 12/1969 | Kuhlkamp et al. .................. 526/318 |
| 3,485,896 | 12/1969 | Popa et al. .................. 260/901 |
| 3,491,070 | 1/1970 | Weaver .................. 260/80.73 |
| 3,501,440 | 3/1970 | Kamio et al. .................. 526/324 |
| 3,639,326 | 2/1972 | Kray et al. .................. 526/324 |
| 3,657,174 | 4/1972 | Glabisch et al. .................. 526/318 |
| 3,690,937 | 9/1972 | Guse et al. .................. 526/318 |
| 3,708,388 | 1/1973 | Lindemann .................. 161/247 |
| 3,723,397 | 3/1973 | Hoh et al. .................. 526/318 |
| 3,755,237 | 8/1973 | Isaacs et al. .................. 526/324 |
| 3,817,896 | 6/1974 | Bergmeister et al. .................. 524/823 |
| 3,823,108 | 7/1974 | Bissot .................. 526/318 |
| 3,923,752 | 12/1975 | Guse et al. .................. 526/318 |
| 3,969,560 | 7/1976 | Lewis et al. .................. 526/318 |
| 3,971,766 | 7/1976 | Ono et al. .................. 526/318 |
| 3,973,045 | 8/1976 | Brandberg .................. 426/110 |
| 3,998,997 | 12/1976 | Mowdood et al. .................. 526/271 |
| 4,001,160 | 1/1977 | Lindemann .................. 260/29 |
| 4,035,329 | 7/1977 | Wiest et al. .................. 524/823 |
| 4,048,411 | 9/1977 | Mietzna et al. .................. 526/324 |
| 4,073,779 | 2/1978 | Wiest et al. .................. 526/318 |
| 4,151,146 | 4/1979 | Patella .................. 526/318 |
| 4,188,441 | 2/1980 | Cook .................. 428/516 |
| 4,245,076 | 1/1981 | Marquardt .................. 526/318 |
| 4,273,145 | 6/1981 | Lester .................. 132/1 R |
| 4,292,332 | 9/1981 | McHam .................. 426/111 |
| 4,299,941 | 11/1981 | Narisawa et al. .................. 526/324 |
| 4,322,516 | 3/1982 | Wiest et al. .................. 526/307.7 |
| 4,448,309 | 5/1984 | Roccaforte .................. 206/525 |
| 4,461,031 | 7/1984 | Blamer .................. 383/123 |
| 4,477,532 | 10/1984 | Schmukler et al. .................. 428/516 |
| 4,507,429 | 3/1985 | Lenney .................. 524/800 |
| 4,510,274 | 4/1985 | Okazaki .................. 523/411 |
| 4,547,428 | 10/1985 | Bekker et al. .................. 526/324 |
| 4,561,108 | 12/1985 | Kamp .................. 383/63 |
| 4,564,664 | 1/1986 | Chang et al. .................. 526/318 |
| 4,596,713 | 8/1976 | Brandberg .................. 426/110 |
| 4,610,920 | 9/1986 | Mudge .................. 428/288 |
| 4,634,629 | 1/1987 | Inaba et al. .................. 428/343 |
| 4,640,838 | 2/1987 | Isakson .................. 426/107 |
| 4,692,366 | 9/1987 | Mudge .................. 428/90 |
| 4,702,957 | 10/1987 | Mudge .................. 428/288 |

FOREIGN PATENT DOCUMENTS

| | | | |
|---|---|---|---|
| 0185356 | 12/1985 | European Pat. Off. | |
| 0073235 | 6/1978 | Japan .................. | 524/823 |
| 1123879 | 8/1968 | United Kingdom .................. | 526/324 |
| 1188635 | 4/1970 | United Kingdom .................. | 526/324 |
| 1430186 | 3/1976 | United Kingdom . | |

OTHER PUBLICATIONS

Aircoflex 100, Technical Bulletin EVA-1, May. 1965.
Stratton, William, "High Shear PS Emulsion Works at High Temperatures", Adhesives Age, Jun. 1985, pp. 21–23.
Dhal, Pradeep K. et al., "Pressure Sensitive Adhesives of Acrylic Polymers Containing Functional Monomers", Polymer, 1982, vol. 23, Jun., p. 937.
CA96(22)184028b; Chemical Abstract: Sayno Chemical Industries, Ltd., Patent Application JP 56/167791, "Low Temperature Flow Improvers".
CA102(8):64744C; Chemical Abstract; Mitsubishi Electric Corp., Patent Application JP 59/138695, "Pour Point Depressants for Crude Petroelum".

*Primary Examiner*—P. C. Ives
*Attorney, Agent, or Firm*—Ellen T. Dec; Edwin M. Szala

[57] ABSTRACT

Wet laminating adhesives capable of withstanding the stresses encountered during heat sealing operations are prepared from emulsion copolymers consisting essentially of 45 to 80% by weight of a vinyl ester of an alkanoic acid, 10 to 30% ethylene, 5 to 30% of dialkyl maleate, 0.5 to 2% of an N-methylol containing comonomer and 0.5 to 4% of an ethylenically unsaturated mono- or di-carboxylic acid. These specific emulsion copolymers are prepared utilizing standard emulsion polymerization procedures with hydroxyethylcellulose or polyvinyl alcohol as a protective colloid. The emulsion polymers thus produced provide superior wet laminating adhesive properties for use in substrates which are to be formed into microwavable packages or bags.

15 Claims, No Drawings

LAMINATING ADHESIVE FOR FILM/PAPER MICROWAVABLE PRODUCTS

BACKGROUND OF THE INVENTION

The present invention is directed to emulsion adhesive compositions used in wet laminating operations to produce multi-ply substrates which may be used to fabricate bags or other products suitable for use in microwave ovens.

Microwavable bags, particularly those adapted for the microwave cooking of popcorn, are generally formed from a laminate comprising two layers of flexible microwave-transparent sheet material. Generally the outer layer is bleached kraft paper and the inner layer, or liner, treated or untreated Mylar or polyethylene. The liner should be a grease proof, heat sealable flexible sheet in order to prevent oil absorption by the paper during storage and popping.

In a typical construction, the bag is formed of a single rectangular piece of the laminate which is subjected to a series of folding and heat sealing operations so as to form a pleated or expandable bag. After filling of the bag with the popcorn, shortening and seasonings, a final heat seal is often used to bond the top portion of the bag. The final bag is gusseted so as to be flexible and expandable during heating. The package has no openings or vents so that the steam given off while heating will expand the bag. It is important that the bag be not only flexible and expandable under stream pressure but also be leak proof during the cooking process. Typical of such constructions are those disclosed, for example, in U.S. Pat. Nos. 4,292,332, 4,461,031 and 4,571,337.

These stringent requirements place heavy demands on the adhesive used to laminate the two plies of sheeting. One of the most difficult tests for the adhesive compositions to pass is in the heat sealing operation where the seams are subjected to temperatures in the order of about 175° C. to 300° C. At these temperatures, the lining becomes thermoplastic and heat seals to itself to form the seam; however, many of the adhesives utilized in laminating the two plies soften at these temperatures causing the bond between the two plies or substrates to fail, weakening the bag, often causing it to delaminate and/or rupture during subsequent use in the microwave oven.

In order to produce adequate initial bonds together with the need to meet the high temperature requirements, laminating adhesives for use in microwaveable products have heretofore been prepared by blending various polymers such as blends of ethylene vinyl acetate emulsion, vinyl acetate emulsion and a soft ethylene vinyl acetate-acrylic latex and especially by adding thereto substantial amounts of epoxy components, often in conjunction with cross-linking activators therefor. These compositions are often unstable over a period of time and suffer the additional disadvantages of short open time and incompatibility with other emulsions.

SUMMARY OF THE INVENTION

We have now found that superior wet laminating adhesives capable of withstanding the stresses encountered during heat sealing operations can be prepared from emulsion copolymers consisting essentially of 45 to 80% by weight of a vinyl ester of an alkanoic acid, 10 to 30% ethylene, 5 to 30% of a dialkyl ($C_4$–$C_8$) maleate, 0.5 to 2% of an N-methylol containing comonomer and 0.5 to 4% of an ethylenically unsaturated mono- or di-carboxylic acid. These specific emulsion copolymers are prepared utilizing standard emulsion polymerization procedures in the presence of a protective colloid. The emulsion polymers thus produced provide superior wet laminating adhesive properties for use in substrates which are to be formed into microwavable bags. Moreover, these results are obtained from the single emulsion polymer and do not require blending with other polymers such as epoxy components.

While the aqueous emulsion adhesives disclosed herein may be prepared using batch or slow-addition polymerization techniques, we have found that those prepared by the batch process provide superior results. As used herein, the term "batch" refers to a process whereby all the major monomers are charged to the reactor initially and the functional monomer(s) added uniformly and concurrently with the initiators. In contrast, the term "slow-addition" refers to a process wherein water, emulsifying agents and optionally a minor portion of the monomers are initially charged in the reactor and the remainder of the monomers then added gradually with the initiators over the course of the reaction.

DESCRIPTION OF THE PREFERRED EMBODIMENTS

The vinyl esters utilized herein are the esters of alkanoic acids having from one to about 13 carbon atoms. Typical examples include: vinyl formate, vinyl acetate, vinyl propionate, vinyl butyrate, vinyl isobutyrate, vinyl valerate, vinyl 2-ethyl-hexanoate, vinyl isoctanoate, vinyl nonoate, vinyl decanoate, vinyl pivalate, vinyl versatate, etc. Of the foregoing, vinyl acetate is the preferred monomer because of its ready availability and low cost.

Any $C_4$ to $C_8$ dialkyl maleate, ether linear or branched may be used herein. Thus dibutyl maleate, dihexyl maleate, dimethyl allyl, di-n-octyl, di-iso-octyl and di-ethyl hexyl may be employed. Additionally, the corresponding fumarate esters are also contemplated since, after polymerization, the structure of the fumarate and maleate (cis and trans isomers) are the same. While the most desirable dialkyl maleate to be employed may vary to some extent or the substrates to be bonded an available balance of properties, dibutyl maleate is generally the preferred comonomer. The amounts of the maleate and the ethylene are selected so as to achieve an overall Tg range of 0° to −30° C. and preferably within the range of about −10° to −20° C. These Tg levels are generally obtained within the range of 10 to 30% ethylene and 5 to 30%, preferably 5 to 25%, of the dialkyl maleate.

The N-methylol component is generally N-methylol acrylamide or N-methylol methacrylamide although other mono-olefinically unsaturated compounds containing an N-methylol group and capable of copolymerizing with ethylene and the vinyl ester may also be employed.

The olefinically-unsaturated carboxylic acids are the alkenoic acids having from 3 to 6 carbon atoms or the alkenedioic acids having from 4 to 6 carbon atoms, like acrylic acid, methacrylic acid, crotonic acid, itaconic acid, maleic acid or fumaric acid, or mixtures thereof in amounts sufficient to give between 0.5 and 4% by weight, of monomer units in the final copolymer. In addition, certain copolymerizable monomers which assist in the stability of the copolymer emulsion, e.g., vinyl sulfonic acid and 2-acrylamido-2-methylpropane sulfonic acid are used herein as latex stabilizers. These stabilizers are added in amounts of from about 0.2 to 3% by weight of the monomer mixture.

Optionally, polyunsaturated copolymerizable monomers may also be present in small amounts, i.e., up to about 1% by weight. Such comonomers would include those polyolefinically-unsaturated monomers copolymerizable with vinyl acetate and ethylene, such as lower alkenyl lower alkenoates, for example, vinyl crotonate, allyl acrylate, allyl methacrylate; di-lower alkenyl alkanedioates, for example, diallyl maleate, divinyl adipate, diallyl adipate; dilower alkenyl benzenedicarboxylates, for example, diallyl phthalate; lower alkanediol di-lower alkenoates, for example, ethylene glycol diacrylate, ethylene glycol dimethacrylate, butanediol dimethacrylate; lower alkylene bis-acrylamides and lower alkylene bis-methacrylamides, for example, methylene bis-acrylamide; triallyl cyanurate, etc.

In accordance with the procedure utilized herein the vinyl acetate, the maleate, ethylene, N-methylol acrylamide and the carboxylic acid are polymerized in an aqueous medium under pressures not exceeding 100 atmospheres in the presence of a catalyst and hydroxyethyl cellulose, the aqueous system being maintained, by a suitable buffering agent, at a pH of 2 to 6, the catalyst being added incrementally. In the preferred embodiment where a batch process is used, the vinyl acetate and the maleate are suspended in water and thoroughly agitated in the presence of ethylene under the working pessure to effect solution of the ethylene in the monomers up to the substantial limit of its solubility under the condition existing in the reaction zone, while the monomers are generally heated to polymerization temperature. The homogenization period is followed by a polymerization period during which the catalyst, which consists of a main catalyst or initiator, and may include an activator, is added incrementally, and the N-methylol and carboxylic acid components are similarly added incrementally, the pressure in the system being maintained substantially constant by application of a constant ethylene pressure if required. In the case of the slow addition, some of the vinyl acetate is generally charged initially, and the remainder pre-emulsified with the dibutyl maleate and the N-methylol component and carboxylic acid and added incrementally.

Suitable as polymerization catalysts are the water-soluble free-radical-formers generally used in emulsion polymerization, such as hydrogen peroxide, sodium persulfates, potassium persulfate and ammonium persulfate, as well as t-butyl hydroperoxide, in amounts of between 0.01 and 3% by weight, preferably 0.1 and 1% by weight based on the total amount of the emulsion. They can be used along or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0.1 to 1% by weight, based on the total amount of the emulsion. The free-radical-formers can be charged in the aqueous emulsifier solution or be added during the polymerization in doses.

As a protective colloid herein is used hydroxyethyl cellulose or polyvinyl alcohol used in amounts of 2 to 3% by weight. Hydroxyethyl cellulose is the preferred colloid. It is possible to use the colloid alone or in mixtures with other emulsifiers which may be anionic or non-ionic surface-active compounds. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethoxylated alkanols and alkylphenols, as well as esters of sulfosuccinic acid. Examples of suitable non-ionic emulsifiers are the addition products of 5 to 50 moles of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof. Preferably the emulsifiers are used as emulsifying agents in amounts of 1 to 2% by weight of the polymerisate.

The polymerization is carried out at a pH of between 2 and 7, preferably betwen 3 and 5. In order to maintain the pH range, it may be useful to work in he presence of customary buffer systems, for example, in the presence of alkali metal acetates, alkali metal carbonates, alkali metal phosphates. Polymerization regulators, including mercaptans such as mercaptoacetic acid and mercaptoethanol; aldehydes; chloroform; methylene chloride and trichloroethylene, can also be added in some cases.

The reaction is generally continued until the residual vinyl acetate content is below about 1%. The completed reaction product is then allowed to cool to about room temperature, while sealed from the atmosphere. The pH is then suitably adjusted to a value in the range of 4.5 to 7, preferably 5 to 6 to insure maximum stability.

By following the procedure described above, particularly the initial saturation of the polymerization mixture with ethylene before polymerization is initiated, there can be produced the stable carboxylated vinyl acetate-dialkyl maleate-ethylene-N-methylol acrylamide interpolymer latex characterized above, with the copolymer having a glass transition temperature of between $-30°$ and $0°$ C., an intrinsic viscosity of 1 to 2 dl./g., and an average particle size of 0.5 to 3 u.

The adhesives according to the invention are suitable for the wet laminating of sheet-like structures comprising one or more of the following materials: Polyolefins, polyesters, polyamides, vinyl and vinylidene polymers, paper and modified cellulose. The adhesives are particularly suitable for wet laminations of flexible substrates of mylar and paper which are to be heat sealed and used in microwaveable applications such as for the formation of bags for popcorn.

The wet laminating adhesives according to the invention are generally applied to the sheetlike substrate by roller application, air brush, intaglio printing, doctor blade apparatus or by spraying. In some cases it has proved advantageous to pretreat the surface to be coated, for exaple, by corona discharge, ozonization, or primer supplement. Generally, a wet film thickness of the adhesive of from 10 to 30 um is adequate. One of the substrates is then wet laminated at room temperature frequently at pressures of approximately 10 to 1,000 $kN/m^2$ to the other substrates so as to form the multi-ply laminate. The resultant laminate is then dried under ambient or superambient temperatures.

A laminate suitable for use in microwave popcorn is formed of an outer layer of a single sheet of kraft paper treated with a commercially available stain inhibitor. The inner layer is a polyester film such as polyethylene terephthalate, an example being Mylar film available from DuPont. Alternative inner layer materials would be coextruded and possibly other multi-ply films of polyethylene terephthalate, as outer plies, with polycarbonate (such as Lexan made by General Electric) and ethylene vinyl alcohol as middle plies. The preferred thickness of this film is about 0.5 to 1.0 mils and it should be capable of withstanding temperatures of 175° to 300° C., as will be encountered in a microwave oven, without melting or otherwise contaminating or imparting flavor to the ingredients.

The laminate is then used to form a bag in which the seams are heat sealed and all seams except that extending along a top edge may have an additional backup seal where the paper is not covered by the film and the paper surfaces are glued together. This is accomplished along a vertical seam extending up the back panel where two adjoining ends of the paper meet. One edge is folded over at the point of overlap to form a film-to-film seal on the part of the overlap closest to the interior of the bag. The remainder of the overlap portion forms a paper-to-paper seal. Since the paper-to-paper seal is the outer seal and the film-to-film seal is an inner seal, the entire interior surface of the bag that is exposed to the ingredients is covered by the film and the ingredients cannot come into direct contact with the paper. The film is impermeable to the shortening which would otherwise tend to seep through the paper at room temperature causing discoloration and an unsanitary condition, particularly if not refrigerated. An oxygen barrier is also formed by the film, thereby increasing the shelf-life of the ingredients. The backup seams insure that the contents cannot escape if one of the film-to-film seals, which are not as strong as the glued paper-to-paper seals, should fail, especially in the presence of the internal steam pressure generated during popping.

The invention is illustrated further by the following examples which are not, however, intended to limit the scope of the invention. Unless otherwise stated, all parts in the examples are by weight.

EXAMPLE I

This example describes the batch preparation of the emulsion polymers utilized as adhesives in accordance with the present invention.

A 10 liter stainless steel autoclave equipped with heating/cooling means, variable rate stirrer and means of metering monomers and initiators was employed. To the 10 liter autoclave was charged 2750 g of water, 135 g of Natrosol 250 LR (hydroxyethylcellulose), 96 g (of a 70% solution in water) of alkyl aryl polyethylene oxide (30 moles ethylene oxide), 2 g sodium acetate, 5 g (of a 1% solution in water) of ferrous sulfate and 4 g sodium formaldehyde sulfoxylate. After purging with nitrogen, 2880 g vinyl acetate and 720 g dibutyl maleate were added. The reactor was pressurized with ethylene to 725 psi, and equilbrated at 50° C. for 15 min.

The reaction was initiated by metering in a solution of 25 g t-butyl hydroperoxide in 200 g water and 20 g sodium formaldehyde sulfoxylate in 200 g water. The addition rate was set for 5 hrs. for both.

After initiation was observed by a batch temperature increase, the slow-addition of 142 g of N-methylol acrylamide (48% in water), 45 g of acrylic acid, and 3.0 g sodium acetate in 800 g of water was started. This was added uniformly over 3.5 hours. The reaction temperature was controlled at 70° to 75° C. during the additions by use of jacket cooling.

At the end of the reaction, the emulsion was transferred to an evacuated vessel (30° C.) to remove residual ethylene.

This process resulted in a polymeric composition of vinyl acetate, ethylene, dibutyl maleate, N-methylol acrylamide and acrylic acid (VA/E/DBM/NMA/AA) in a 68/15/17/1.5/1 ratio. It was designated Emulsion 1. The polymer had a Tg as measured by differential scanning calorimetry of −12° C.

The emulsion properties were as follows:

| | |
|---|---|
| % Solids: | 51.4 |
| pH: | 3.7 |
| Visc.: | 920 cps |
| I.V. In dimethyl formamide: | 1.0 dl/g |

Using a similar procedure the following emulsion polymer compositions were prepared using the same levels of ethylene, acrylic acid and N-methylol acrylamide but varying the amount of vinyl acetate and the type and amount of dialkyl maleate.

TABLE I

| Emulsion | Vinyl Acetate | Dialkyl Maleate | |
|---|---|---|---|
| | | Type | Amount |
| 1 | 68 | Dibutyl | 17 |
| 2 | 68 | Dioctyl | 17 |
| 3 | 76.5 | Dioctyl | 8.5 |
| 4 | 63.8 | Dibutyl | 21.2 |
| 5 | 76.5 | Dibutyl | 8.5 |
| 7 | 68 | Dimethyl allyl | 17 |

The samples were evaluated using the following procedures to simulate the end use performance requirements of the microwave packaging market:

ADHESION

8 WW (wire wound rod) laminations were made and allowed to dry overnight at room temperature. Then the adhesion was evaluated by pulling the laminations apart rating the percentage of fiber tearing.

MICROWAVE RESISTANCE

8 WW laminations were made and allowed to dry overnight at room temperature. These laminations were then taped at the corners of the paper to a glass plate, with the film side up. The glass plate was placed in the bottom of a 700 watt microwave, and was microwaved at 100% power for 10 seconds. Sparking and edge curl of film was noted during microwaving. The lamination was removed from the glass plate and adhesion was evaluated by pulling apart and rating fiber tear.

HEAT RESISTANCE

8 WW laminations were made and allowed to dry overnight at room temperature. 1"×3" strips were then cut, and reinforced holes were made at one end. Samples were hung from the shelf of a forced draft oven, and a 50 g weight was attached. Beginning at 100° F., the temperature was increased by 10° F. every 10 minutes until the bonds failed.

Also tested were two "control" formulations: Control "A" was a currently commercially employed hydroxyethyl cellulose stabilized ethylene vinyl acetate polymer which contains some carboxyl groups but no NMA or maleate. Control "B" was a polyvinyl alcohol stabilized ethylene vinyl acetate copolymer such as described in U.S. Pat. No. 3,708,388.

The results of this testing are shown in Tables II, III and IV. In the tables, FC is an abbreviation for flurocarbon-treated paper, a greaseproof paper used in the manufacture of popcorn bags. The fluorocarbon treated paper was bonded to aluminum metallized polyester film and also to a machine finished (MF) paper lamination.

Other constructions were prepared by laminating aluminum or stainless steel metallized polyester (mylar) to a clay coated (SBS) board in order to simulate susceptors, i.e., devices used in microwave packaging to cause browning of the food product.

TABLE II
(HEAT RESISTANCE)

| Emulsion | Metallized Mylar to FC Paper | FC Paper to MF Paper | Aluminum Metallized Mylar to SBS | Stainless Steel Metallized Mylar to SBS | Metallized Mylar to Polyester (Film/Film) |
|---|---|---|---|---|---|
| 1 | 390° F. | 420° F. | 420° F. | 370° F. | 165° F. |
| 2 | 420° F. | 420° F. | 180° F. | 340° F. | 160° F. |
| 3 | 405° F. | 425° F. | 390° F. | 405° F. | 160° F. |
| 4 | 370° F. | 400° F. | 190° F. | 180° F. | 160° F. |
| 5 | 400° F. | 425° F. | 400° F. | 410° F. | 160° F. |
| 6 | 420° F. | 420° F. | 370° F. | 390° F. | 160° F. |
| A | 420° F. | 425° F. | 345° F. | 410° F. | 160° F. |
| B | Poor Bond | 425° F. | Poor Bond | Poor Bond | 160° F. |

TABLE III
(ADHESION)

| Emulsion | Metallized Mylar to FC Paper | FC Paper to MF Paper | Aluminum Metallized Mylar to SBS | Stainless Steel Metallized Mylar to SBS | Metallized Mylar to Polyester (Film/Film) |
|---|---|---|---|---|---|
| 1 | 100% FT | 100% FT | 100% FT | 100% FT | zip |
| 2 | 100% FT | 100% FT | 100% FT | 100% FT | tight zip |
| 3 | 100% FT | 100% FT | 100% FT | 100% FT | zip |
| 4 | 100% FT | 100% FT | 100% FT | 100% FT | zip |
| 5 | 100% FT | 100% FT | 100% FT | 100% FT | zip |
| 6 | 100% FT | 100% FT | 100% FT | 100% FT | zip |
| A | 100% FT | 100% FT | 100% FT | 100% FT | weak zip |
| B | zip | 100% FT | zip | zip | zip |

TABLE IV
(MICROWAVE TEST)

| Emulsion | Metallized Paper to FC Paper | FC Paper to MF Paper | Aluminum Metallized Mylar to SBS | Stainless Steel Metallized Mylar to SBS | Metallized Mylar to Polyester (Film/Film) |
|---|---|---|---|---|---|
| 1 | 100% FT some crazing | 100% FT some crazing | 100% FT no crazing | 100% FT slt. crazing | weak suction |
| 2 | 100% FT some crazing | 100% FT | 100% FT some crazing | 20% film shrinkage no crazing | weak suction some crazing |
| 3 | 100% FT some crazing | 100% FT | 100% FT some crazing | 100% FT no crazing | weak suction slt. crazing |
| 4 | 100% FT some crazing | 100% FT | 100% FT some crazing | 100% FT - 50% film shrinkage | weak suction slt. crazing |
| 5 | 100% FT some crazing | 100% FT | 100% FT some crazing | no crazing - 10% film shrinkage | weak suction slt. crazing |
| 6 | 100% FT some crazing | 100% FT | 100% FT some crazing | 100% FT no crazing | weak suction slt. crazing |
| A | 100% FT some crazing | 100% FT | 100% FT film shrinkage | no crazing - 15% some crazing | zip some crazing |
| B | poor bond | 100% FT | poor bond | 95% FT no crazing | weak zip some crazing |

Testing was also done on polyester film to film laminations as are used for shield constructions in microwave packaging.

The results of the above testing show thayt optimum results as shown by a superior balance between heat resistance and adhesion can be obtained using the compositions disclosed herein with the choice of the specific comonomeric components and amounts thereof to be determined by one skilled in the art depending upon the substrates to be bonded. In particular, the preferred compositions containing dibutyl maleate offer the best balance of properties over the widest range of substrates.

While the commercially utilized control A gives satisfactory results for some substrates in the testing above, it is generally necessary, on an industrial scale to formulate this ethylene vinyl acetate copolymer as well as that of Control B with up to about 10% plasticizer, such as a phthalate, in order to obtain adequate initial adhesion. The addition of these substantial amounts of plasticizer, while improving initial adhesion, has a negative effect upon the heat resistance properties. In contrast, the testing of the compositions of the present invention on industrial equipment does not indicate a requirement for the addition of plasticizers and, even in cases where small amounts (i.e., the range of 2-3%) of plasticizer may be used to wet the substrates, the quantity of plasticizer employed is substantially less.

To further demonstrate the wide range of applicability of the adhesives disclosed herein for use in microwave packaging, an additional series of tests were performed comparing the adhesion of adhesive emulsion #1 as compared to Controls A and B when used to bond 30 pound greaseproof (fluorocarbon treated) paper to Mobil OPP 278-T (Corona treated) and also to 2 mil corona treated mylar.

Test procedure: 8 WW laminations, air dried 24 hours; Instron data: cross head speed 2 inch/min. 0-2 lb. scale.

| | Test Results | |
|---|---|---|
| Emulsion | Greaseproof/Opp | Greaseproof/Mylar |
| 1 | 0.5 lb/inch | 1.1 lb/inch |
| A | 0.5 lb/inch | 0.2 lb/inch |
| B | 0.4 lb/inch | <0.1 lb/inch |

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A laminate suitable for use in the construction of microwavable packages or bags comprising a substrate selected from the group consisting of polyolefins, polyesters, polyamides, vinyl and vinylidene polymers, paper and modified cellulose bonded to the same or a dissimilar substrate with a wet laminating adhesive prepared from an emulsion copolymer having a Tg of 0° to −30° C. and consisting essentially of 45 to 80% by weight of a vinyl ester of an alkanoic acid having one to 13 carbon atoms; 10 to 30% ethylene; 5 to 30% of a dialkyl ($C_4$–$C_8$) maleate; 0.5 to 2% of an N-methylol containing comonomer; 0.5 to 4% of an ethylenically unsaturated mono- or di-carboxylic acid; 0.2 to 3% of a stabilizer and 0 to 1% of a polyunsaturated copolymerizable monomer, which emulsion has been prepared in water using hydroxyethylcellulose or polyvinyl alcohol as the protective colloid.

2. The laminate of claim 1 wherein the dialkyl maleate is dibutyl maleate.

3. The laminate of claim 1 wherein the vinyl ester in the emulsion copolymer is selected from the group consisting of vinyl formate, vinyl acetate, vinyl propionate, vinyl butyrate, vinyl isobutyrate, vinyl valerate, vinyl 2-ethyl-hexanoate, vinyl isoctanoate, vinyl nonoate, vinyl decanoate, vinyl pivalate and vinyl versatate.

4. The laminate of claim 3 wherein the vinyl ester is vinyl acetate.

5. The laminate of claim 1 wherein the N-methylol containing comonomer in the emulsion copolymer is N-methylol acrylamide or N-methylol methacrylamide.

6. The laminate of claim 1 wherein the ethylenically unsaturated acid in the emulsion copolymer is selected from the group consisting of acrylic acid, methacrylic acid, crotonic acid, itaconic acid, maleic acid or fumaric acid and mixtures thereof.

7. The laminate of claim 1 wherein the emulsion copolymer has a Tg of −10° to −20° C.

8. The laminate of claim 1 wherein hydroxyethycellulose is used as the protective colloid.

9. The laminate of claim 1 wherein the protective colloid is present in the emulsion in am amount of 2 to 3% by weight.

10. The laminate of claim 1 wherein an anionic or non-ionic surfactant is used in addition to the protective colloid.

11. The laminate of claim 10 wherein the surfactant is selected from the group consisting of alkyl sulfonates, alkylaryl sulfonates, alkyl sulfates of hydroxyalkanols, alkyl and alkylaryl disulfonates, sulfonated fatty acids, sulfates and phosphates of polyethoxylated alkanols and alkylphenols, esters of sulfosuccinic acid, the addition products of 5 to 50 moles of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof, and is present in amounts of 1 to 2% by weight of the polymerisate.

12. The laminate of claim 1 wherein the emulsion copolymer is prepared using batch polymerization techniques.

13. The laminate of claim 1 wherein a polymerization regulator is employed during the polymerization of the emulsion copolymer.

14. The laminate of claim 1 comprising a bleached kraft paper outer layer bonded to a treated or untreated polyester or polyethylene film inner layer.

15. The laminate of claim 1 used in the construction of a microwaveable bag for popcorn.

* * * * *